March 16, 1954     G. H. SHOPTAW     2,672,435
ACRYLONITRILE PURIFICATION PROCESS BY DISTILLATION
Filed Dec. 4, 1952
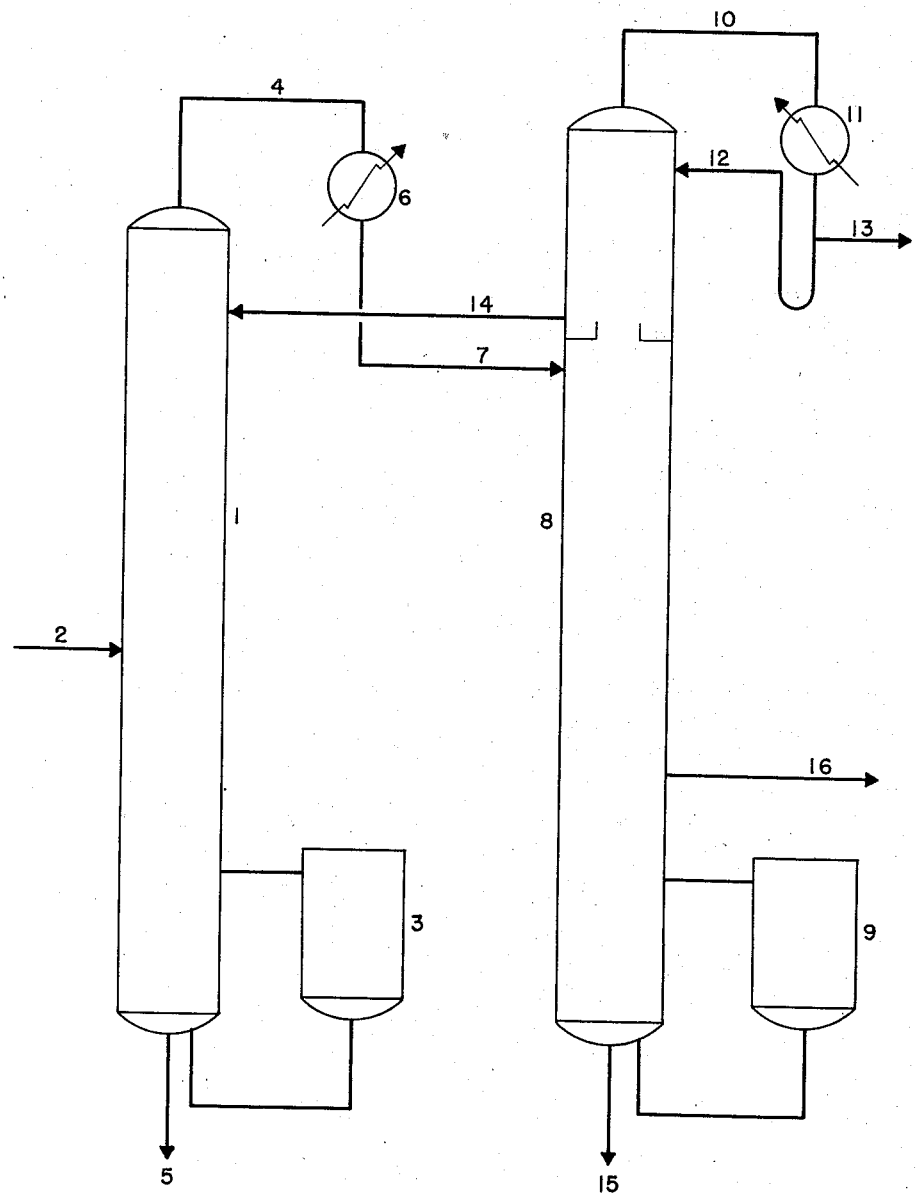
INVENTOR.
Glen H. Shoptaw
ATTORNEY Patented Mar. 16, 1954

2,672,435

UNITED STATES PATENT OFFICE 2,672,435

ACRYLONITRILE PURIFICATION PROCESS BY DISTILLATION

Glen H. Shoptaw, Texas City, Tex., assignor to Monsanto Chemical Company, St. Louis, Mo., a corporation of Delaware Application December 4, 1952, Serial No. 323,973

6 Claims. (Cl. 202—40)

This invention relates to the purification of acrylonitrile. More particularly, the invention relates to an improved method of removing acetaldehyde and hydrogen cyanide from crude acrylonitrile.

Acrylonitrile has become an important chemical of commerce, having found particular application in the field of plastics and resins and in the development of synthetic fibers. For many of these specialty uses, particularly where the chemical is employed in polymerization processes, it is of great importance that the acrylonitrile be of the highest degree of chemical purity. In the preferred method for the production of this nitrile, i. e., by the reaction of acetylene with hydrogen cyanide in the presence of copper salts, the crude product is always contaminated with many types of impurities. Purification of the crude product poses many problems, one of the more serious of which involves the removal of acetaldehyde and hydrogen cyanide, especially when both these compounds are present.

By the conventional purification methods, acrylonitrile containing on the order of about 2000 p. p. m. (parts by weight per million parts of acrylonitrile) each of acetaldehyde and hydrogen cyanide can be produced without too much difficulty. Such methods, however, are ineffective for producing acrylonitrile of the requisite high purity required for many commercial processes, e. g., to meet usual specifications calling for 5 p. p. m. or less of hydrogen cyanide and 100 p. p. m. or less of acetaldehyde. Ordinary distillation techniques fail, for example, because of the very nature of the impurities. Acetaldehyde and hydrogen cyanide are present in acrylonitrile both as the free aldehyde and hydrogen cyanide and also combined as lactonitrile. In liquid solution, the equilibrium $$CH_3CHOHCN \rightleftharpoons HCN + CH_3CHO$$

exists. However, at the temperatures required for fractionation, the lactonitrile in the bottom of the column partially dissociates into acetaldehyde and hydrogen cyanide and contaminating quantities of both these compounds are invariably removed overhead with the acrylonitrile product.

Some chemical methods of purification have been devised such as, e. g., the method proposed in U. S. Patent 2,351,157, but, on the whole, these are elaborate and expensive both from an operational standpoint and from the standpoint of equipment required.

It is an object of this invention, therefore, to provide an improved process for the purification of acrylonitrile.

It is a particular object of this invention to provide a process for the purification of acrylonitrile whereby acrylonitrile substantially free from hydrogen cyanide and acetaldehyde is obtained.

It is a further object of the invention to provide an improved physical system of purification of acrylonitrile which is simple and economical whereby acrylonitrile substantially free from acetaldehyde and hydrogen cyanide is obtained.

Other objects and advantages will be apparent from the following description of the invention.

It has now been discovered that substantially pure acrylonitrile can be obtained from crude acrylonitrile containing acetaldehyde, hydrogen cyanide, lactonitrile and other high boilers by a distillation process which comprises feeding the crude acrylonitrile into the intermediate section of a primary fractionating column, withdrawing the high-boiling impurities including undissociated lactonitrile from the bottom of the primary column, withdrawing acrylonitrile, hydrogen cyanide, and acetaldehyde overhead, condensing said overhead stream and introducing it immediately into an intermediate section of a second fractionating column where free acetaldehyde and HCN vapors are withdrawn overhead, condensed, and returned to the column as reflux while a liquid stream of acrylonitrile is withdrawn from one of the plates in the top section of said second fractionating column and returned to the primary column to serve as the necessary reflux, and recovering substantially pure acrylonitrile from the bottom of the second fractionating column.

The process of the invention is based upon the fact that in the equilibrium reaction mentioned above, the rate of recombination of acetaldehyde and hydrogen cyanide is reasonably slow. The highly efficient separation achieved is, therefore, dependent upon minimization of hold-up time throughout the system. In the system of the invention, any lactonitrile formed during distillation by recombination of acetaldehyde and HCN is always returned from the final fractionating column for reworking via the total liquid draw-off to the primary column and never contaminates the product acrylonitrile.

The process of the invention will be more clearly understood from the following description of a specific embodiment with reference to the attached diagrammatic flowsheet illustrating the same.

Referring to the drawing, numeral 1 represents a fractionating column into which a crude acrylonitrile stream containing acetaldehyde, HCN, lactonitrile and other impurities boiling higher than acrylonitrile is introduced via line 2. Sufficient heat is supplied to the column by means of the reboiler 3 to provide boil-up in the column so that acrylonitrile and any hydrogen cyanide and acetaldehyde present in the feed or formed by the decomposition of lactonitrile are withdrawn overhead by means of line 4. Lactonitrile and other impurities boiling higher than acrylonitrile are removed from the bottom of the column through line 5. The overhead stream of acrylonitrile, acetaldehyde, and hydrogen cyanide is condensed in condenser 6 and fed immediately via line 7 into an intermediate section of a second fractionating column 8.

In column 8, heated by means of reboiler 9, the acetaldehyde and hydrogen cyanide are separated from acrylonitrile with the acetaldehyde and hydrogen cyanide being continuously withdrawn overhead via line 10, condensed in condenser 11 and returned to the top section of the column via line 12 to provide the necessary reflux. A bleed stream of acetaldehyde and hydrogen cyanide containing small amounts of acrylonitrile is removed via line 13 to prevent an accumulation of the low boiling components in the top of the column and to maintain the desired conditions. This stream may be reprocessed for recovery of its acrylonitrile values.

All of the liquid acrylonitrile is removed from a liquid collecting tray in the upper section of the second fractionating column and is returned via line 14 to the upper section of the primary fractionating column to provide reflux therefor. This insures that any lactonitrile which may have been formed by recombination of acetaldehyde and hydrogen cyanide is withdrawn as it is formed and returned to the primary column, thus eliminating any possibility of it being withdrawn with acrylonitrile from the bottom of the column. Acrylonitrile, substantially free of acetaldehyde and hydrogen cyanide, is withdrawn from the bottom of the column either as a liquid stream via line 15 or as a vapor stream via line 16.

The following example is illustrative of the effectiveness of the process of the invention:

A stream of crude acrylonitrile having the following composition

| | Percent (by weight) |
|---|---|
| Acrylonitrile | 94.0 |
| Acetaldehyde | 0.5 |
| Hydrogen cyanide | 0.01 |
| Laconitrile | 2.5 |
| High boilers | 3.0 | is distilled in a system like that represented in the attached drawing and following the same general procedure outlined above. The feed is introduced into a fractionating column of approximately 11 plates which is operated at a pressure of 140 mm. of Hg absolute. Bottoms temperature is maintained as approximately 50° C. while the overhead temperature is kept at about 30° C. The condensed overhead stream is introduced into a second fractionating column, operating at a pressure of about 140 mm. of Hg and containing approximately 8 plates, on about the 5th plate. The bottoms temperature of this column is maintained at approximately 30° C. while the overhead temperature is controlled at about 30° C. The liquid collecting plate is located about 4 plates from the top of the column. Product acrylonitrile recovered from the column is of extremely high purity containing only 5 p. p. m. (0.0005%) of hydrogen cyanide and substantially no acetaldehyde.

While the example given specifies distillation at reduced pressure and this represents preferred operation, the process of the invention is not restricted thereto and it may be carried out at atmospheric or superatmospheric pressure if desired.

The distillation process is preferably carried out in a continuous manner but batchwise operation is equally effective.

What is claimed is:

1. A method of refining crude acrylonitrile containing acetaldehyde, hydrogen cyanide, and lactonitrile which comprises feeding the said acrylonitrile into an intermediate section of a fractionating column, withdrawing high-boiling impurities including the undissociated lactonitrile from the bottom of said fractionating column, removing acrylonitrile, hydrogen cyanide, and acetaldehyde overhead, condensing said overhead stream and introducing it immediately into an intermediate section of a second fractionating column, withdrawing acetaldehyde and hydrogen cyanide vapors overhead, condensing said vapors and returning them as reflux to the top of said second fractionating column, removing the liquid acrylonitrile at a point in the upper section of said second fractionating column and returning it to the first fractionating column to provide reflux therefor, and recovering substantially pure acrylonitrile from the bottom of said second fractionating column.

2. A method of refining crude acrylonitrile containing acetaldehyde, hydrogen cyanide, and lactonitrile which comprises continuously feeding the said acrylonitrile into an intermediate section of a fractionating column, continuously withdrawing high-boiling impurities including the undissociated lactonitrile from the bottom of said fractionating column, continuously removing acrylonitrile, hydrogen cyanide, and acetaldehyde overhead, continuously condensing said overhead stream and continuously introducing it immediately into an intermediate section of a second fractionating column, continuously withdrawing acetaldehyde and hydrogen cyanide vapors overhead, continuously condensing said vapors and returning them as reflux to the top of said second fractionating column, continuously removing the liquid acrylonitrile at a point in the upper section of said second fractionating column and continuously returning it to the first fractionating column to provide reflux therefor, and continuously recovering substantially pure acrylonitrile from the bottom of said second fractionating column.

3. A method of refining crude acrylonitrile containing acetaldehyde, hydrogen cyanide, and lactonitrile which comprises continuously feeding the said acrylonitrile into an intermediate section of a fractionating column maintained at subatmospheric pressure, continuously withdrawing high-boiling impurities including the undissociated lactonitrile from the bottom of said fractionating column, continuously removing acrylonitrile, hydrogen cyanide, and acetaldehyde overhead, continuously condensing said overhead stream and continuously introducing it immediately into an intermediate section of a second fractionating column maintained at subatmospheric pressure, continuously withdrawing acetaldehyde and hydrogen cyanide vapors overhead, continuously condensing said vapors and returning them as reflux to the top of said second fractionating column, continuously removing the liquid acrylonitrile at a point in the upper section of said second fractionating column and continuously returning it to the first fractionating column to provide reflux therefor, and continuously recovering substantially pure acrylonitrile from the bottom of said fractionating column.

4. A method of refining crude acrylonitrile containing acetaldehyde, hydrogen cyanide and lactonitrile which comprises feeding the said acrylonitrile into an intermediate section of a fractionating column, withdrawing high-boiling impurities including the undissociated lactonitrile from the bottom of said fractionating column, removing acrylonitrile, hydrogen cyanide, and acetaldehyde overhead, condensing said overhead stream and introducing it immediately into an intermediate section of a second fractionating column, withdrawing acetaldehyde and hydrogen cyanide vapors overhead, condensing said vapors and returning them as reflux to the top of said second fractionating column, removing the liquid acrylonitrile at a point in the upper section of said second fractionating column, returning it to the first fractionating column to provide reflux therefor, and recovering substantially pure acrylonitrile as a liquid from the bottom of said second fractionating column.

5. A method of refining crude acrylonitrile containing acetaldehyde, hydrogen cyanide and lactonitrile which comprises feeding the said acrylonitrile into an intermediate section of a fractionating column, withdrawing high-boiling impurities including the undissociated lactonitrile from the bottom of said fractionating column, removing acrylonitrile, hydrogen cyanide, and acetaldehyde overhead, condensing said overhead stream and introducing it immediately into an intermediate section of a second fractionating column, withdrawing acetaldehyde and hydrogen cyanide vapors overhead, condensing said vapors and returning them as reflux to the top of said second fractionating column, removing the liquid acrylonitrile at a point in the upper section of said second fractionating column and returning it to the first fractionating column to provide reflux therefor, and recovering substantially pure acrylonitrile as a vapor from the bottom of said second fractionating column.

6. A method of refining crude acrylonitrile containing acetaldehyde, hydrogen cyanide and lactonitrile which comprises feeding the said acrylonitrile into an intermediate section of a fractionating column, withdrawing the high-boiling impurities including lactonitrile from the bottom of said fractionating column, removing acrylonitrile, hydrogen cyanide, and acetaldehyde overhead, condensing said overhead stream and introducing it immediately into an intermediate section of a second fractionating column, withdrawing acetaldehyde and hydrogen cyanide vapors overhead, bleeding off a portion of said vapors while condensing the remainder, returning the condensate as reflux to the top of said second fractionating column, removing the liquid acrylonitrile at a point in the upper section of said second fractionating column and returning it to the first fractionating column to provide reflux therefor, and recovering substantially pure acrylonitrile as a vapor from the bottom of said second fractionating column.

GLEN H. SHOPTAW.

References Cited in the file of this patent

UNITED STATES PATENTS

| Number | Name | Date |
| --- | --- | --- |
| 2,324,854 | Kurtz et al. | July 20, 1943 |
| 2,415,662 | Teter et al. | Feb. 11, 1947 |
| 2,417,635 | Davis | Mar. 18, 1947 |
| 2,526,676 | Lovett | Oct. 24, 1950 |
| 2,555,798 | Kropa | June 5, 1951 |